May 27, 1952     C. A. SAMUEL     2,598,609
HYDRAULIC CYLINDER PISTON
Filed July 25, 1947
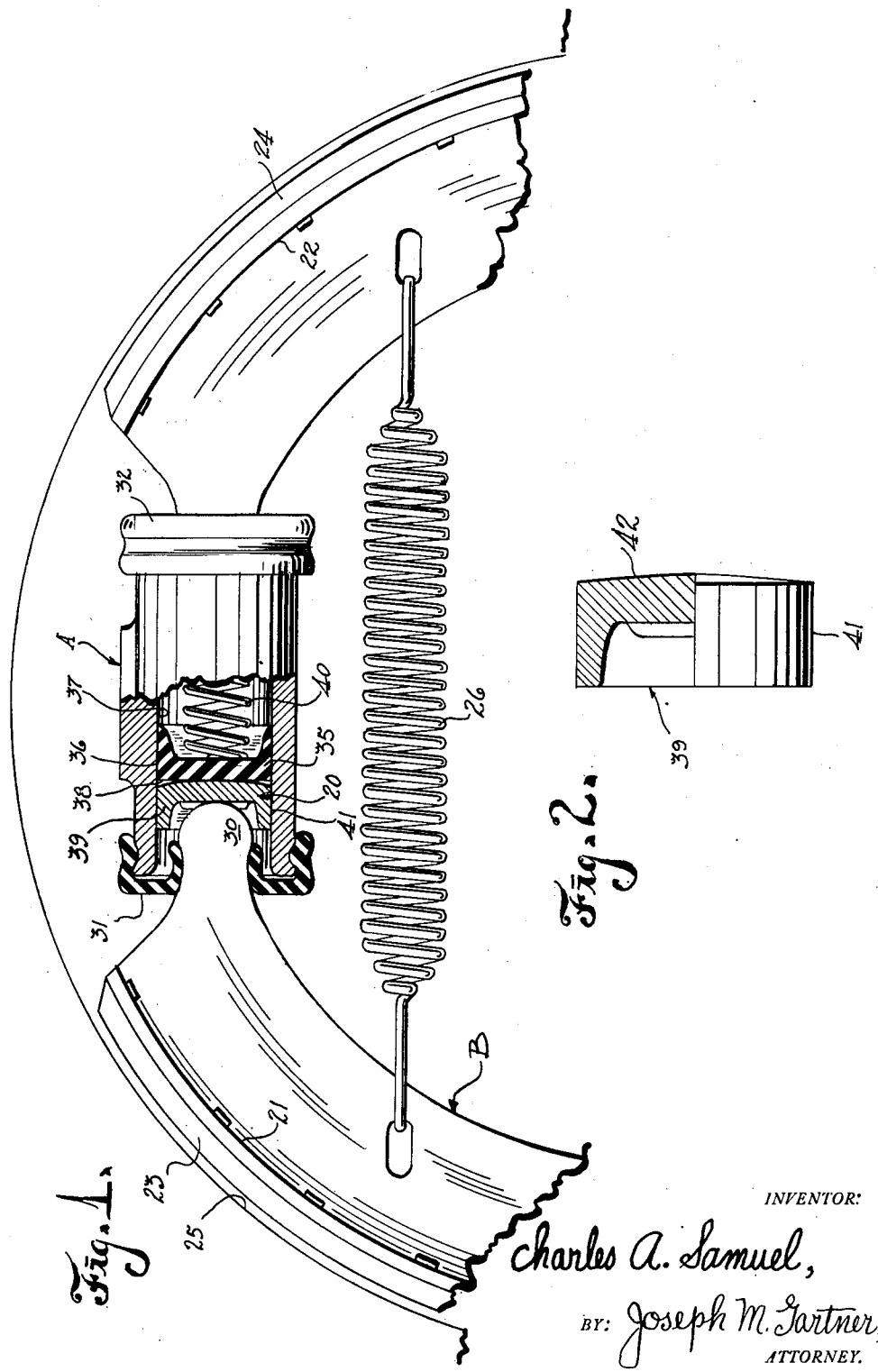
INVENTOR:
Charles A. Samuel,
BY: Joseph M. Gartner,
ATTORNEY.

Patented May 27, 1952

2,598,609

UNITED STATES PATENT OFFICE 2,598,609

HYDRAULIC CYLINDER PISTON

Charles A. Samuel, Forest Park, Ill.

Application July 25, 1947, Serial No. 763,464

9 Claims. (Cl. 60—54.6)

1

This invention relates in general to hydraulic brake mechanisms adaptable to be employed in wheel brake systems of automotive vehicles and is particularly concerned with new and useful improvements in pistons for hydraulic cylinders normally incorporated in such hydraulic brake mechanisms.

Heretofore, brake mechanisms of this general class consisted of a hydraulic cylinder operatively disposed between two conventional brake bands and having suitable pistons operatively disposed therein and operable in opposed directions upon actuation of a conventional brake pedal through a hydraulic master cylinder. The pistons incorporated in the prior art brake mechanisms comprise a washer formed of a flexible material such as, for example, rubber and said washer usually is disposed in contact with a metallic piston having portions thereof in engagement with end portions of a brake band. In such prior art constructions it has been found that the washers begin to leak after a relatively short period of operation, thereby causing an uneven application of the brakes which will cause the automotive vehicle to swerve from one side or the other when the brakes are applied.

Accordingly, an object and accomplishment of the invention is to provide a brake mechanism having incorporated therein, an improved piston construction for the hydraulic cylinder incorporated in such brake mechanisms which will prolong the life and term of operation of such pistons.

Another object and accomplishment of the invention is to provide the brake mechanism employing a piston for a hydraulic cylinder incorporated in such mechanisms employing an improved construction which will increase the efficiency of operation of the brake mechanism.

The invention seeks, as a further object and accomplishment to provide improvements in hydraulic brake cylinders as contemplated herein, and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of the pistons associated with a hydraulic cylinder incorporated in brake mechanisms, thereby to increase the efficiency and versatility of such brake mechanism; and to this end, an important feature of the invention is to provide a brake mechanism

2 comprising in general, conventional brake bands adaptable to be operatively associated with a suitable brake drum, said brake bands having operatively disposed therebetween a conventional hydraulic cylinder having operatively disposed therein a pair of pistons adaptable to operate in opposite directions thereby to force said brake bands into engagement with their associated brake drum, said pistons each comprise a washer formed of a suitable flexible material such as, for example, rubber, to define a generally cup-like shape and having a flat surface, and a metallic piston of generally cup-like shape and having portions normally in engagement with end portions of a brake band and having an arcuate surface normally in engagement with said flat surface of the washer, thereby to cause the said washer to flex during the operation of the brake mechanism which will increase the life of the washer and provide a more efficient seal for the hydraulic fluid.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing which forms a part of this specification, wherein:

Fig. 1 is a fragmentary sectional elevational view of the brake mechanism embodying the features of this invention and having portions broken away to more advantageously show the construction thereof; and Fig. 2 is an enlarged sectional elevational view of a piston member embodying the features of the present invention.

The drawing is to be understood as being more or less of a schematic character for the purpose of illustrating and disclosing a typical or preferred form of the improvements contemplated herein and in the drawing like reference characters identify the same parts in the several views.

Referring to the drawing, particularly to Fig. 1, I have illustrated the improved piston construction for hydraulic cylinder with which the invention is particularly concerned and designated in its entirety by the numeral 20 as being operatively associated with a conventional hydraulic cylinder designated in its entirety by the letter A, said hydraulic cylinder being adjunctively employed, for example, to a conventional wheel brake assembly designated in its entirety by the letter B, the said conventional brake mechanism being adaptable for advantageous employment in a conventional automotive vehicle (not shown).

The illustrated brake mechanism may comprise conventional brake bands 21 and 22 having secured thereto, by any approved practice, friction facing material 23 and 24, respectively, said friction facing material being adaptable to engage a suitable drum 25 upon operation of the device.

In order to urge the brake bands 21 and 22 to their normally inoperative position there is provided a conventional tension spring 26 illustrated as being operatively associated with the brake bands 21 and 22 in a manner to draw said brake bands toward each other a predetermined distance, thereby to disengage the friction facings 23 and 24 from the brake drum 25 when the brake mechanism is in released position.

To cause the brake bands 23 and 24 to engage the drum 25 there is provided a hydraulic cylinder A, said hydraulic cylinder being provided with suitable conduits (not shown) adaptable to connect the same with a conventional hydraulic master cylinder (not shown), which in turn is operatively associated with the brake pedal (not shown) of a conventional automotive vehicle.

Suffice it to say, since the invention is not particularly concerned with the precise construction of the illustrated brake mechanism and/or the general construction of the wheel brakes of an automotive vehicle and/or their associated parts, they will not be further described in detail, and it is deemed sufficient for all intentions and purposes herein contained to show only portions thereof adjacent to and cooperating with the piston construction 20 contemplated herein. It is to be understood that details of construction of such wheel brake mechanism and/or their associated parts may be modified to suit particular conditions and in some instances the piston construction contemplated herein may be advantageously employed in other hydraulic cylinders such as, for example, the master cylinder of an automotive braking mechanism, and I do not wish to be limited to the construction of these elements as set forth, except where such construction particularly concerns the invention contemplated herein.

Having thus described, by way of example, a possible adaptation of the piston construction 20 as contemplated herein and having described the general environment surrounding the adaptation, the specific construction and cooperating functions of the parts of said piston construction 20 with which the present invention is particularly concerned, will now be described in detail.

In the exemplary embodiment of the invention depicted in Figs. 1 and 2, the hydraulic brake mechanisms comprise, in general, a hydraulic cylinder A operatively disposed between the conventional brake bands 21 and 22 and has incorporated therein an improved piston construction 20 with which the present invention is particularly concerned, said pistons being adaptable to operate in opposed directions and having portions thereof in engagement with end portions 30 of the brake bands, said hydraulic cylinder being provided with removable end caps 31 and 32 formed of a flexible material such as, for example, rubber, and adaptable to prevent oil, dirt or other foreign matter from entering the interior of the cylinder A.

The piston arrangement 20 may comprise a conventional washer 35 formed of suitable flexible material such as, for example, rubber, to define a cup-like shape, said washer being operatively disposed within the hydraulic cylinder A so that the side surface 36 is in sealing engagement with a central through bore 37 of the hydraulic cylinder A. It is notable that the washer 35 is provided with a flat surface 38 normally in engagement with portions of a metallic hydraulic piston 39. In order to cause the washer 35 to assume its operative position at all times there is usually provided a compression spring 40 of suitable tension and thickness and disposed between the two washers like 35 disposed in the hydraulic cylinder A.

It is, of course, understood that the peripheral surface 36 of the washer 35 is normally fixed in relation to the cylinder wall due to the substantially increased amount of friction between these elements effected by the action of the convex surface 42 coupled with residual fluid pressures in the system and counter acting springs as at 26 but there may be a slight relative movement between these parts under certain circumstances to be hereinafter explained and the term "locked" is used in the specification and claims to indicate the normally fixed position of the surface 36 with respect to the cylinder wall 37.

Although both ends of the cylinder A are of similar construction, only one side is broken away to more advantageously show the construction thereof.

In accordance with the construction of the present invention the metallic hydraulic piston 39 is formed to define a generally cup-like shape and having a side surface 41 normally in free sliding engagement with the internal bore 37 of the hydraulic cylinder A.

Adverting to Figs. 1 and 2 of the drawing, it can been seen that the metallic hydraulic piston 39 is provided with an arcuate surface 42 which is normally in engagement with the flat surface 38 of the rubber washer 35.

It is a well-known fact that flexing of rubber increases the life span of the rubber. Heretofore, it has been found in prior art structures that the conventional rubber washers would soon leak because no means of causing the rubber to flex was provided. In a relatively short period of time the surface 36 would be worn through normal usage and the rubber washer would then leak and cause inefficient application of the braking mechanism.

The effect of the arcuate surface 42 is to cause flexing of the rubber washer 35 during operation of the device. It can be seen that this flexing is advantageously accomplished when the flat surface 38 of the washer 35 is bent upon the arcuate surface 42 of the metallic hydraulic piston 39, thereby causing the side surface 36 of the washer 35 to bend outwardly and be forced into sealing engagement against the internal bore 37 of the hydraulic cylinder A. Thus, it can be seen that the arcuate surface 42, which is an important feature of the invention, not only increases the life span of the rubber washer 35 by causing the same to be flexed during each operation of the brake but further provides a more efficient operation of the braking mechanism by the provision of a more effective seal of the hydraulic fluid.

It can be seen that application of the principles of the present invention, that is to say, the employment of an arcuate surface like 42 to a metallic hydraulic piston as at 39 may not only be applied to wheel brake hydraulic cylinders as illustrated, but may be equally advantageously applied to master cylinders (not shown) of brake assemblies or to any other such hydraulic cylinders employing a rubber washer in engagement with a metallic hydraulic piston.

The operation of the device may be as follows: In order to cause the brake mechanism to operate, the operator will push the conventional brake pedal (not shown) downwardly which will cause hydraulic fluid via suitable connector conduits (not shown) to enter into the cylinder A from a master cylinder (not shown), thereby causing the piston assembly as at 20 to move outwardly of said cylinder in opposed directions. This action will cause the facings 23 and 24 carried between brake bands 21 and 22 respectively, to engage the brake drum 25. When the brakes are subsequently released the action of the tension spring 26 will urge the friction facings away from the drum 25.

During each operation of the braking mechanism, as hereinbefore described, and by virtue of the arcuate surface 42, the rubber washer 35 will be flexed, thereby increasing the life of the rubber washer and providing a more effective seal between the side surface 36 of the washer 35 of the internal bore 37 of the hydraulic cylinder A. Because of the fact that flexing of the rubber washer will increase its life, the efficiency and the effective life span of the brake mechanism is substantially increased.

From the foregoing disclosure, it may be observed that I have provided an improved hydraulic piston construction for hydraulic cylinders which efficiently fulfills the objects thereof as hereinbefore set forth and which provides numerous advantages which may be summarized as follows:

1. Structurally simple, efficient and durable;
2. Economical to manufacture and readily adaptable to mass production principles;
3. The provision of a brake mechanism having incorporated therein an improved piston construction for the hydraulic cylinder incorporated in such brake mechanisms which piston construction will prolong the life and term of operation which will not only prolong the life and term of such brake mechanisms, but will increase their efficiency of operation as well.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. In a fluid actuated motor unit including means defining a cylinder, means defining a relatively non-flexible piston like member reciprocable in said cylinder, and means defining a flexible generally disc-like member, said piston-like member and said flexible disc-like member being operatively disposed in said cylinder in confronting relationship, the confronting surface of at least one of said members defining a generally convex shape, the periphery of said flexible disc-like member defining an axially extending surface normally complementary to the internal bore of said cylinder, means arranged to exert an increasing and decreasing degree of fluid pressure upon the flexible disc-like member, and means arranged to exert a pressure upon the piston-like member in the opposite direction, whereby the coaction of said convex surface of one of the members upon the confronting surface of the other member and of said pressures exerted in opposed direction upon the piston-like member and the flexible disc-like member will cause the axially extending surface of said flexible disc-like member to move radially outwardly to thus produce a seal and locked relation with the bore of the cylinder followed by a diaphragm action in the central portions of said flexible disc-like member, the flexible disc-like member being arranged so that any increase in fluid pressure disposed upon the flexible disc-like member greater than the pressure disposed upon the piston-like member will be reflected upon the central portions of the flexible disc-like member, thereby to overcome the force of the pressure exerted upon the piston-like member and move the piston axially in the cylinder a normal predetermined distance to perform work while the axially extending surface of the flexible disc-like member is in the seal and locked relation, the action of the flexible disc-like member being particularly characterized by its mode of coaction to adjustment when the piston is caused to move axially beyond the normal predetermined distance, whereupon the flexible disc-like member will be caused to unlock itself and follow the axial movement of the piston-like member to assume a new position whereupon the seal and locked relationship and the diaphragm action is repeated.

2. In a fluid actuated motor having means defining a cylinder, a piston member reciprocally disposed in said cylinder, and a flexible generally disc-like member disposed adjacent one terminal of said piston, the periphery of said disc-like member normally being complementary to the internal bore of said cylinder, said arrangement being particularly characterized by the provision of generally coaxial protuberance on the adjacent terminal of one of said members arranged upon reciprocation of said piston in the direction of said flexible member to engage the same in radially spaced relation to the periphery thereof, whereby to cause the portion of said periphery adjacent said piston to move radially inwardly and the portion of said periphery removed from said piston to move radially outwardly to thus produce a seal and locked relation with the bore of said cylinder followed by a diaphragm action in the central portion of said flexible member reflectible upon the piston to cause movement of the piston axially in the cylinder to perform work.

3. In a fluid actuated motor unit including means defining a cylinder, means defining a relatively non-flexible piston-like member reciprocable in said cylinder, and means defining a flexible generally disc-like member, said piston-like member and said flexible disc-like member being operatively disposed in said cylinder in confronting relationship, the confronting surface of at least one of said members defining a generally convex shape, the periphery of said flexible disc-like member defining an axially extending surface normally complementary to the internal bore of said cylinder, means arranged to exert an increasing and decreasing degree of fluid pressure upon the flexible disc-like member, means arranged to exert a pressure upon the piston-like member in the opposite direction, said piston-like member and said flexible disc-like member being arranged for co-action in a first phase of operation wherein the coaction of said convex surface of one of the members upon the confronting surface of the other member and of said pressures exerted in opposed direction upon the piston-like member and the flexible disc-like member will cause the axially extending surface of said flexible disc-like member to move radially outwardly to thus produce a seal and locked relation with the bore of the cylinder followed by a second phase of operation wherein a diaphragm action is imparted by the central portions of said flexible disc-like member, the flexible disc-like member being arranged so that any increase in fluid pressure disposed upon the flexible disc-like member greater than the pressure disposed upon the piston-like member will be reflected upon the central portions of the flexible disc-like member, thereby to overcome the force of the pressure exerted upon the piston-like member and move the piston axially in the cylinder a normal predetermined distance to perform work while the axially extending surface of the flexible disc-like member is in the seal and locked relation, the second phase of operation being followed by a third phase of operation wherein the flexible disc-like member and the piston-like member are arranged to coact to readjustment when the piston is caused to move axially beyond the normal predetermined distance, whereupon the flexible disc-like member will be caused to unlock itself and follow the axial movement of the piston-like member to assume a new position whereupon the seal and locked relationship and the diaphragm action is repeated.

4. In a fluid actuated motor, a hydraulic cylinder, and a piston and flexible member arranged in confronting relation and movably disposed in the cylinder, the surface of the piston confronting the flexible member defining a general convex shape and the surface of the flexible member confronting the piston normally defining a flat surface, means arranged to exert a predetermined fluid pressure upon the flexible member, means arranged to exert a mechanical pressure upon the piston, whereby the coaction of the convex surface of the piston upon the flat surface of the flexible member and of said pressures exerted in opposed direction upon the piston and the flexible members cause the peripheral edges of the flexible member to sealingly engage the cylinder wall to lock the flexible member in operative position, said flexible member being arranged so that any increase in fluid pressure disposed upon the flexible member greater than the mechanical pressure disposed upon the piston will be reflected upon the central portions thereof to cause a diaphragm action to the flexible member, thereby to overcome the force of the mechanical pressure means and move the piston axially in the cylinder a normal predetermined distance to perform work.

5. In a fluid actuated motor unit including means defining a cylinder, means defining a relatively non-flexible piston-like member reciprocable in said cylinder, and a means defining a flexible generally cup-like member, said piston-like member and said flexible cup-like member being operatively disposed in said cylinder in confronting relationship, the periphery of said flexible cup-like member defining an axially extending surface normally complementary to the internal bore of said cylinder, said fluid actuated motor including means arranged to exert an increasing and decreasing degree of fluid pressure upon the flexible cup-like member, and means arranged to exert a pressure upon the piston-like member in the opposite direction, one of said members having means arranged to react upon the confronting surface of the other member and this reaction in combination with the coaction of said pressures exerted in opposed direction upon the piston-like member and the flexible cup-like member cause the axially extending surface of said flexible cup-like member to move radially outwardly to thus produce a seal and locked relation with the bore of the cylinder followed by a diaphragm action in the central portions of said flexible cup-like member, the flexible cup-like member being arranged so that any increase in fluid pressure disposed upon the flexible cup-like member greater than the pressure disposed upon the piston-like member will be reflected upon the central portions of the flexible cup-like member, thereby to overcome the force of the pressure exerted upon the piston-like member and move the piston axially in the cylinder a normal predetermined distance to perform work while the axially extending surface of the flexible disc-like member is in the seal and locked relation.

6. In combination, means defining a cylinder, a piston reciprocally disposed in said cylinder, a flexible generally disc-like member disposed adjacent one terminal of said piston, the periphery of said disc-like member normally being complementary to the internal bore of said cylinder, said arrangement being particularly characterized by the provision of a generally coaxial protuberance on the adjacent terminal of said piston arranged upon reciprocation of said piston in the direction of said flexible member to engage the same in radially spaced relation to the periphery thereof, whereby to cause the portion of said periphery adjacent said piston to move radially inwardly and the portion of said periphery removed from said piston to move radially outwardly to thus produce a seal and locked relation with the bore of said cylinder followed by a diaphragm action in the central portion of said flexible member upon application of fluid pressure to the flexible member to cause predetermined axial movement of the piston for performance of work.

7. In combination, a hydraulic cylinder, a piston and flexible member arranged in confronting relation and movably disposed in the cylinder, the confronting surface of the piston defining a general convex shape and the confronting surface of the flexible member normally defining a flat surface, means arranged to exert a predetermined fluid pressure upon the flexible member, means arranged to exert a mechanical pressure upon the piston in the opposite direction, whereby the coaction of the convex surface of the piston upon the flat surface of the flexible member and of said pressures exerted in opposed direction upon the piston and the flexible members cause the peripheral edges of the flexible member to sealingly engage the cylinder wall and to lock the flexible member in operative position, said flexible member being arranged so that any increase in fluid pressure disposed upon the flexible member greater than the mechanical pressure disposed upon the piston will be reflected upon the central portions of the flexible member to cause a diaphragm action to the flexible member, thereby to overcome the force of the mechanical pressure means and move the piston axially in the cylinder a normal predetermined distance to perform work on an associated mechanism which may be subjected to wear, the action of the flexible member being particularly characterized by its reaction to adjustment when the piston is caused to be moved axially beyond the normal predetermined distance to compensate for wear of the associated mechanism, whereupon the flexible member will be caused to unlock itself and follow the axial movement of the piston to assume a new position whereupon the locking and diaphragm action is repeated.

8. In combination, means defining a cylinder, means defining a relatively non-flexible piston-like member reciprocable in said cylinder, and means defining a flexible generally disc-like member, said piston-like member and said flexible disc-like member being operatively disposed in said cylinder in confronting relationship, the confronting surface of at least one of said members defining a generally convex shape, the periphery of said flexible disc-like member defining an axially extending surface normally complementary to the internal bore of said cylinder, means arranged to exert an increasing and decreasing degree of fluid pressure upon the flexible disc-like member, means arranged to exert a pressure upon the piston-like member in the opposite direction, whereby the coaction of said convex surface of one of the members upon the confronting surface of the other member and of said pressures exerted in opposed direction upon the piston-like member and the flexible disc-like member will cause the axially extending surface of said flexible disc-like member to move radially outwardly to thus produce a seal and locked relation with the bore of the cylinder.

9. In combination, means defining a cylinder, a piston member reciprocally disposed in said cylinder, a flexible generally disc-like member disposed adjacent one terminal of said piston, the periphery of said disc-like member normally being complementary to the internal bore of said cylinder, said arrangement being particularly characterized by the provision of generally coaxial protuberances on the adjacent terminal of said piston arranged upon reciprocation of said piston in the direction of said flexible member to engage the same in radially spaced relation to the periphery thereof, whereby to cause the portion of said periphery adjacent said piston to move radially inwardly and the portion of said periphery removed from said piston to move radially outwardly to thus produce a seal and locked relation with the bore of said cylinder followed by a diaphragm action in the central portion of said flexible member reflectible upon the piston to cause movement of the piston a normal predetermined distance axially in the cylinder to perform work, the action of the flexible disc-like member being particularly characterized by its mode of coaction to adjustment when the piston is caused to move axially beyond the normal predetermined distance, whereupon the flexible disc-like member will be caused to unlock itself and follow the axial movement of the piston member to assume a new position whereupon the seal and locked relationship and the diaphragm action is repeated.

CHARLES A. SAMUEL.

REFERENCES CITED

The following references are of record in the file of this patent:

UNITED STATES PATENTS

| Number | Name | Date |
| --- | --- | --- |
| 2,036,038 | Gottlieb | Mar. 31, 1936 |
| 2,059,444 | Dick | Nov. 3, 1936 |
| 2,308,875 | Goepfrich | Jan. 19, 1943 |
| 2,371,554 | Scott-Iversen | Mar. 13, 1945 |
| 2,417,476 | Finley | Mar. 18, 1947 |